US011173494B2

(12) United States Patent
Lessard

(10) Patent No.: US 11,173,494 B2
(45) Date of Patent: Nov. 16, 2021

(54) REDUCTION GEAR FOR A STIRRED MILL, AND CORRESPONDING MILL AND USE

(71) Applicant: Compagnie Engrenages et Reducteurs-Messian-Durand, Cambrai (FR)

(72) Inventor: Fabrice Lessard, Cambrai (FR)

(73) Assignee: COMPAGNIE ENGRENAGES ET REDUCTEURS-MESSIAN-DURAND, Cambrai (FR)

( * ) Notice: Subject to any disclaimer, the term of this patent is extended or adjusted under 35 U.S.C. 154(b) by 279 days.

(21) Appl. No.: 15/558,573

(22) PCT Filed: Mar. 17, 2016

(86) PCT No.: PCT/EP2016/055782
§ 371 (c)(1),
(2) Date: Sep. 15, 2017

(87) PCT Pub. No.: WO2016/146734
PCT Pub. Date: Sep. 22, 2016

(65) Prior Publication Data
US 2018/0050343 A1    Feb. 22, 2018

(30) Foreign Application Priority Data

Mar. 17, 2015 (FR) ...................... 1552194

(51) Int. Cl.
*F16H 57/023* (2012.01)
*B01F 15/00* (2006.01)
*B02C 17/24* (2006.01)

(52) U.S. Cl.
CPC ........ *B02C 17/24* (2013.01); *B01F 15/00435* (2013.01); *B01F 15/00681* (2013.01);
(Continued)

(58) Field of Classification Search
CPC ..... B02C 19/0025; B02C 19/22; B02C 17/16; B02C 17/163; B02C 17/24; B02C 17/181;
(Continued)

(56) References Cited

U.S. PATENT DOCUMENTS 3,438,462 A * 4/1969 Nelson ................... F16C 17/04
184/6
4,572,442 A   2/1986 Sigg
(Continued)

FOREIGN PATENT DOCUMENTS

AU    2016232213 B2    9/2016
CN    2449798 Y        9/2001
(Continued)

OTHER PUBLICATIONS

Machine translation of CN-201871399, 2 Pages. (Year: 2011).*
(Continued)

*Primary Examiner* — Gregory D Swiatocha
(74) *Attorney, Agent, or Firm* — Soquel Group LLC

(57) ABSTRACT

Reduction gear for driving a stirred mill including a reduction gear housing, an input shaft suitable for being connected to a drive motor, a reduction stage arranged in the reduction gear housing, and an output shaft that is suitable for being connected to a stirred mill element and which is suitable for being driven by the reduction stage, the output shaft including a proximal axial side, associated with the reduction stage, and a distal axial side, opposite the proximal axial side and intended to be fastened to the stirred mill element, the reduction gear including an axial stop, which is suitable for axially guiding the output shaft and which is suitable for limiting an axial movement of the output shaft in a direction oriented from the proximal axial side toward the distal axial side.

16 Claims, 2 Drawing Sheets

(52) U.S. Cl.
CPC .... *F16H 57/023* (2013.01); *B01F 2015/0011* (2013.01); *B01F 2015/00623* (2013.01)

(58) Field of Classification Search
CPC ........ B01F 17/00841; B01F 2015/0011; B01F 7/00841; B01F 15/00681
See application file for complete search history.

(56) References Cited

U.S. PATENT DOCUMENTS

| | | | |
|---|---|---|---|
| 4,753,534 A | 6/1988 | Markle | |
| 5,209,085 A * | 5/1993 | Brien | D06F 37/40 192/18 B |
| 6,401,561 B1 | 6/2002 | Hosle | |
| 2016/0144373 A1* | 5/2016 | Haas | B02C 17/163 241/172 |

FOREIGN PATENT DOCUMENTS

| | | | |
|---|---|---|---|
| CN | 201862446 U * | 6/2011 | |
| CN | 201871399 U * | 6/2011 | |
| CN | 201989042 U * | 9/2011 | |
| CN | 101248290 B | 6/2012 | |
| CN | 102705467 A | 10/2012 | |
| CN | 102728440 A * | 10/2012 | |
| CN | 102728440 B | 4/2014 | |
| CN | 102941141 B | 11/2014 | |
| CN | 104265841 B | 10/2016 | |
| DE | 1557107 D1 | 1/1971 | |
| DE | 3244308 A1 | 11/1982 | |
| DE | 32 26 816 A1 | 1/1984 | |
| DE | 199 17 609 A1 | 11/2000 | |
| EP | 1 757 839 A1 | 2/2007 | |
| JP | 5396564 | 8/1978 | |
| JP | 5995946 A | 6/1984 | |
| JP | 08089828 A | 4/1996 | |
| JP | 2000314454 A | 11/2000 | |
| JP | 2000314457 A | 11/2000 | |
| JP | 2002001143 A | 1/2002 | |
| JP | 2002172342 A | 6/2002 | |
| JP | 2006187735 A | 7/2006 | |
| JP | 2009506271 A | 2/2009 | |
| JP | 2014526373 A | 10/2014 | |
| WO | 1994020201 A1 | 9/1994 | |
| WO | WO-0021651 A1 * | 4/2000 | .......... B01F 15/0072 |
| WO | 2009001397 A2 | 12/2008 | |

OTHER PUBLICATIONS

Machine translation of CN 201989042, 5 Pages. (Year: 2011).*
Machine Translation of CN 201862446, 3 Pages. (Year: 2011).*
Machine Translation of WO 0021651, 5 Pages. (Year: 2000).*
Machine Translation of CN 102728440, 4 Pages. (Year: 2012).*
PCT Application No. PCT/EP2016/055782, Rapport de Recherch Internationale, May 19, 2016, 4 pages.
INPI Rapport de Recherche Préliminaire for Patent Application No. 1552194, Jan. 11, 2016, 2 pp.
Lu, S. et al., "Application of Large Vertical Spiral Stirring Mill," Copper Engineering, Beijing General Institute of Mining and Metallurgy, Beijing 100160, China, 2014, 5 pp.
Abbreviated Translation of JP08089828A.
MachineTranslation of JP2000314454A.
Abbreviated Translation of JP2000314457A.
MachineTranslation of JP2006187735A.
Abbreviated Translation of JP2009506271A.
Abbreviated Translation of JP2014526373A.
Katalog KupplungenMD_Oct. 1, 2007.
KatalogPlanurex-2-PlanetengetriebeMD_20.3_2006-2007.
KatalogPlanurex-2-PlanetengetriebeMD_20.3 2010.
LieferscheinSIPM40013146023_zum_Auftrag_4711098.
JP2000314455A_Translation.
Machine Translation: Lu, S. et al., "Application Status of Large-Scale Vertical Spiral Mixing Mill," Copper Engineering, Beijing General Institute of Mining and Metallurgy, Beijing 100160, China, 2014, 10 pp.
NachdruckSücklistezumAuftrag_4711098.
Technische-Zeichnung_5856760_Auftrag_4711098.
Technische-Zeichnung_5856851_Auftrag_4711098.
V01_mit-Schwarzungen.
V02_mit-Schwarzungen.
Zusammenbauzeichnung_5856759_Auftrag_4711098.

* cited by examiner

REDUCTION GEAR FOR A STIRRED MILL, AND CORRESPONDING MILL AND USE

The invention relates to a reduction gear for driving a stirred mill, of the type comprising:
- a reduction gear housing,
- an input shaft suitable for being connected to a drive motor,
- a reduction stage arranged in the reduction gear housing, and
- an output shaft, which extends along an output axis (Y-Y), which is suitable for being connected to a stirred mill element and which is suitable for being driven by the reduction stage.

Stirred mills are known in the state of the art comprising a stirred milling element and a mill housing. Stirred mills of the known type also comprise a reduction gear and a motor for driving the stirred milling element.

The stirred milling element is generally guided by a radial bearing and an axial bearing arranged on the mill housing. The milling element is connected by an elastic coupling to the output shaft of the reduction gear such that the output shaft of the reduction gear is stressed only by the rotational force.

Optionally, the distal end of the milling element is mounted on a radial bearing arranged in the mill housing.

The solutions of the state of the art do not make it possible to transmit a high power, given that the applied forces become too substantial to be reacted by the bearings of the mill housing. Furthermore, the known stirred mills are complicated to assemble.

The invention aims to design a reduction gear for driving a stirred mill that allows substantial milling forces to be reacted for given dimensions of the mill. Furthermore, the invention aims to propose a reduction gear for driving a stirred mill that allows more cost-effective assembly of the stirred milling element. The reduction gear must in particular be suitable for stirred mills with very high powers, in particular greater than 746 kW (1000 HP).

To that end, the invention relates to a reduction gear for driving a stirred mill as defined above, characterized in that the output shaft comprises a proximal axial side, associated with the reduction stage, and a distal axial side, opposite the proximal axial side and intended to be fastened to the stirred mill element, and in that the reduction gear comprises an axial stop, which is suitable for axially guiding the output shaft and which is suitable for limiting an axial movement of the output shaft in a direction oriented from the proximal axial side toward the distal axial side.

According to specific embodiments, the reduction gear according to the invention may include one or more of the following features:
- the axial stop is either an axial bearing, in particular hydrostatic or hydrodynamic, or a thrust bearing with rolling elements;
- the reduction gear housing comprises an outlet wall defining an outlet opening that is traversed by the output shaft, the reduction gear comprises a radial output bearing, in particular a radial rolling bearing, arranged in the outlet opening, and the output shaft is guided relative to the outlet wall by the radial outlet wall;
- the axial stop is arranged axially between the reduction stage and the outlet wall, in particular in which the axial stop bears on the outlet wall;
- the output shaft comprises a fastening flange suitable for fastening the stirred milling element;
- the reduction stage comprises a planet reduction gear, and this planet reduction gear is provided with:
  - a planet carrier,
  - a crown,
  - a sun gear, and
  - planet gears,
  - in particular the output shaft is fastened to the planet carrier and/or the input shaft is fastened to the sun gear; and
- the reduction stage comprises at least one simple parallel gear train, in particular with cylindrical sprockets.

The invention also relates to a stirred mill of the type comprising:
- a mill housing,
- a stirred milling element,
- a drive reduction gear of the milling element, characterized in that the drive reduction gear is a reduction gear as defined above, and in that the stirred milling element is fastened to the output shaft by a fastening coupler.

The stirred mill may include one or more of the following features:
- the milling element is guided and maintained relative to the mill housing completely via the drive reduction gear;
- the milling element is kept cantilevered by the reduction gear relative to the mill housing and/or the milling element comprises a free end that is spaced away from the mill housing;
- all of the forces acting on the stirred milling element, and in particular all of the milling forces, are reacted only by the axial stop, and optionally by the radial bearing.

The invention also relates to the use of a reduction gear as defined above or a mill as defined above, comprising the step:
- reacting all of the forces acting on the stirred milling element, and in particular all of the milling forces, in particular during milling at a nominal power of the mill, by the axial stop, and optionally by the radial bearing.

The invention will be better understood upon reading the following description, provided solely as an example and done in reference to the appended drawings, in which.

Hereinafter, unless otherwise indicated, the expressions "axially" and "radially" will be used relative to the axis of the element to which they refer.

Figure 1:
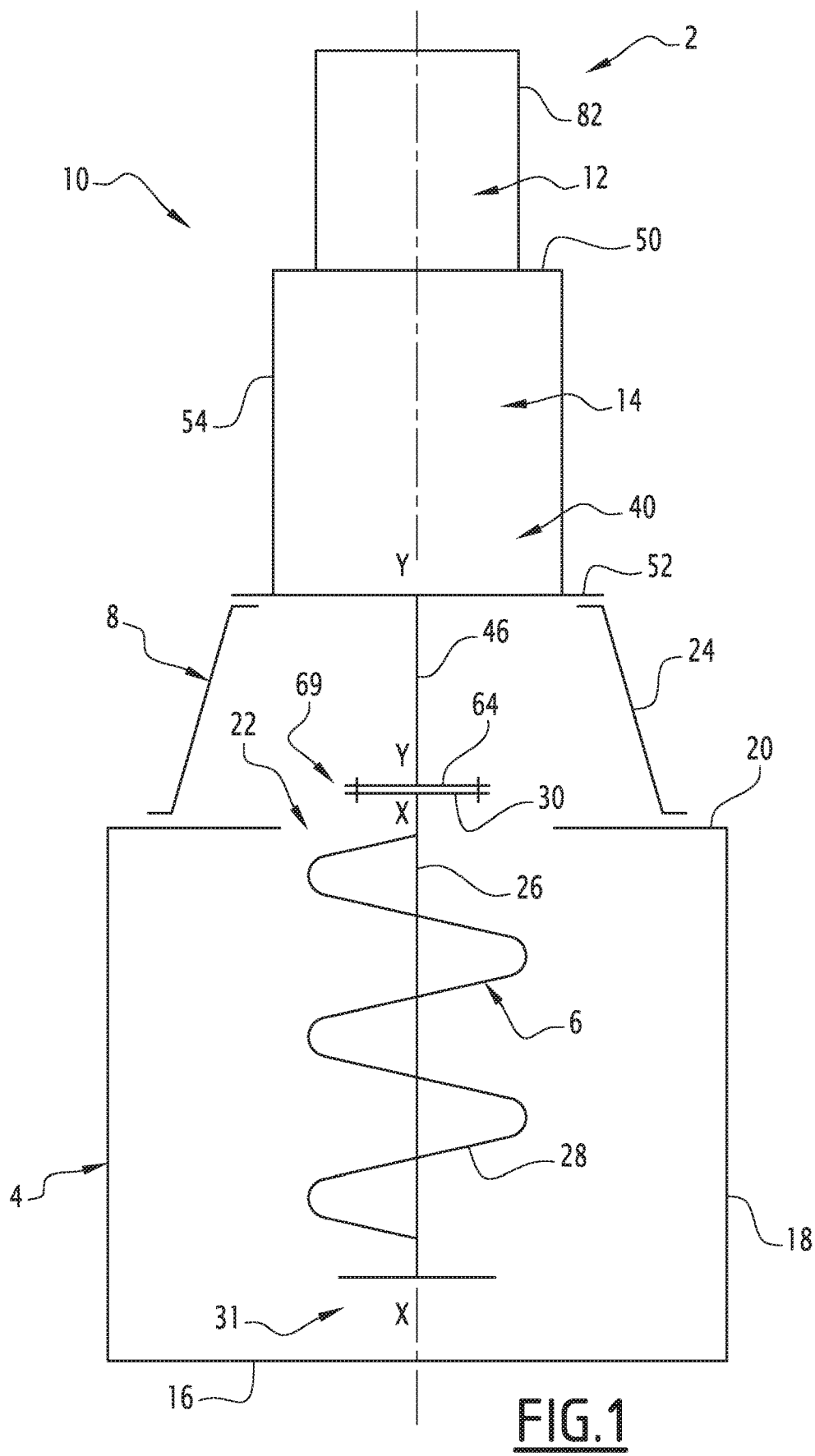
FIG. 1 is a schematic view of a stirred mill according to the invention.
Figure 2:
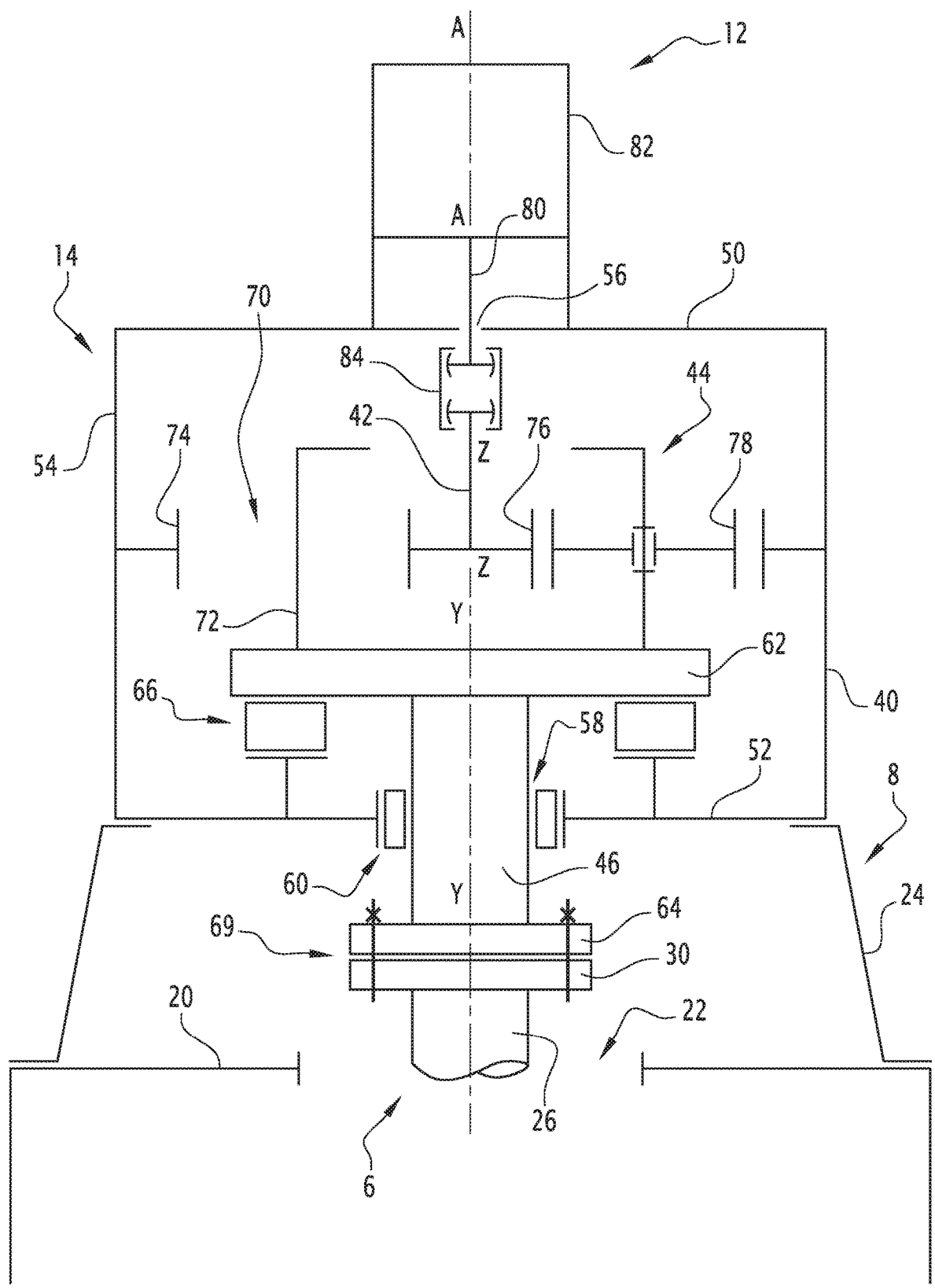
FIG. 2 is an enlarged schematic sectional view of part of the stirred mill of FIG. 1.

FIG. 1 shows a stirred mill according to the invention, designated by general reference 2.

The stirred mill 2 comprises a mill housing 4, a stirred milling element 6, a drive support 8, and a drive device 10 of the milling element 6.

The drive device 10 is provided with a drive motor 12 and a reduction gear 14. The drive device 10 is suitable for rotating the milling element 6, via the drive motor 12 and the reduction gear 14. The drive motor 12 is an electric motor in particular having a nominal power above 746 kW (1000 HP).

The mill housing 4 is provided with a bottom wall 16, a side wall 18, which is for example cylindrical, in particular with a circular section, and a ceiling wall 20. The drive support 8 is arranged on the ceiling wall 20 and serves as a spacer between the mill housing 4 and the reduction gear 14. The drive support 8 for example comprises a frustoconical support wall 24 and two fastening flanges. Alternatively, the drive support 8 is omitted. In this case, the mill housing 4 is adjacent to the reduction gear housing 40.

The ceiling wall 20 defines a housing opening 22 through which the milling element 6 extends inside the mill housing 4.

The milling element 6 extends along a milling axis X-X, arranged vertically. The milling element 6 comprises a milling shaft 26, extending along the milling axis X-X, and at least one milling member 28, for example a milling helix. The milling member 28 can also comprise milling discs or milling fingers extending perpendicular to the milling axis X-X.

The milling shaft 26 is provided with a fastening flange 30, which forms an axial connecting end of the milling member 6. Furthermore, the milling element 6 comprises a free axial end 31. This axial end 31 is spaced away from the milling housing 4 and is not supported by a radial bearing arranged in the mill housing 4. More particularly, the axial end 31 is arranged away from the bottom wall 16. The milling element 6 is kept cantilevered by the reduction gear 14 relative to the mill housing 4.

The reduction gear 14 is provided with a reduction gear housing 40, an input shaft 42, a reduction stage 44 and an output shaft 46.

The reduction gear 14 is suitable for transmitting a rotation of the input shaft 42 to the output shaft 46. The output rotation speed is lower than the input rotation speed.

The reduction gear housing 40 comprises an inlet wall 50, associated with the input shaft 42, an outlet wall 52, associated with the output shaft 46, and a connecting wall 54 connecting the inlet wall 50 to the outlet wall 52. The connecting wall 54 is generally cylindrical, in particular with a circular section. The inlet wall 50 defines an inlet opening 56. The outlet wall 52 defines an outlet opening 58 that is traversed by the outlet shaft 46.

The output shaft 46 extends along an output axis Y-Y and the input shaft 42 extends along an input shaft Z-Z. These two axes Y-Y and Z-Z are coaxial.

The reduction gear 14 also comprises a radial output bearing 60, which is for example a radial rolling bearing. The output shaft 46 is radially guided relative to the outlet wall 52 by the radial output bearing 60. The radial output bearing 60 is arranged in the outlet opening 58.

The radial output bearing 60 is for example a rolling bearing with cylindrical rolling elements.

The output shaft 46 comprises a proximal axial side, associated with the reduction stage 44. The proximal axial side is formed by a support flange 62. The output shaft 46 comprises a distal axial side, associated with the milling element 6. The distal axial side is formed by a fastening flange 64.

The reduction gear 14 is provided with an axial stop 66, which is suitable for axially guiding the output shaft 46 and which is suitable for limiting an axial movement of the output shaft 46 relative to the reduction gear housing 40 along the output axis Y-Y in a direction oriented from the proximal axial side toward the distal axial side. The axial stop 66 axially guides the output shaft 46 and limits the axial movement of the output shaft 46 relative to the reduction gear housing 40 along the output axis Y-Y in the direction oriented from the proximal axial side toward the distal axial side. To that end, the support flange 62 bears on the axial stop 66 and the axial stop 66 is supported by the outlet wall 52.

The axial stop 66 is therefore arranged axially between the support flange 62 and the outlet wall 52. The axial stop 66 bears on the outlet wall 52.

The axial stop 66 is a bearing with hydrostatic pads or a bearing with hydrodynamic pads. These bearings can withstand very substantial forces. Alternatively, the axial stop 66 is a thrust bearing with rolling elements, for example rollers or beads.

Thus, all of the forces acting on the milling element 6, and in particular all of the milling forces generated by the milling process, are transmitted to the output shaft 46 and reacted by the outlet wall 52.

In particular, all of the radial forces generated by the milling process and applied on the milling element 6 are transmitted to the output shaft 46 and are reacted by the radial output bearing 60 on the outlet wall 52.

The torque generated by the milling process, applied on the milling element 6 and acting around an axis perpendicular to the milling axis X-X or the output axis Y-Y, is transmitted to the output shaft 46 and is transmitted by the axial stop 66 onto the outlet wall 52.

The weight of the milling element 6 and acting vertically downward is also reacted in full by the axial stop 66. The milling element 6 is suspended by the output shaft 46 from the axial stop 66.

All of the axial forces generated by the milling process and applied on the milling element 6 are transmitted to the output shaft 46 and are reacted by the axial stop 66 on the outlet wall 52.

The fastening flange 64 of the output shaft 46 is fastened to the fastening flange 30 of the stirred milling element 6, both axially and radially. The stirred mill comprises a fastening coupler 69 of the output shaft 46 to the milling element. This fastening coupler 69 is rigid, i.e., does not allow the output shaft 46 to move relative to the milling element 6 during the milling operation. The fastening coupler 69 therefore has no degree of freedom. In the present case, the fastening coupler 69 comprises the fastening flange 64 of the output shaft 46 is fastened to the fastening flange 30 of the stirred milling element 6.

The reduction stage 44 comprises a planet reduction stage 70 that is provided with a planet carrier 72, a crown 74, a sun gear 76 and planet wheels 78.

The output shaft 46 is fastened in rotation to the planet carrier 72, in particular is secured in rotation and translation relative to the planet carrier 72. More particularly, the output shaft 46 is secured to the support flange 62, which is secured to the planet carrier 72. Preferably, the support flange 62 and/or the planet carrier 72 and/or the output shaft 46 are integral or in a single piece. The crown 74 is fastened to the reduction gear housing 40 and is for example secured to the connecting wall 54.

The input shaft 42 is fastened to the sun gear 76, in particular these two elements being integral or in a single piece.

The drive motor 12 comprises a driveshaft 80, with motor axis A-A and a motor housing 82. The motor shaft 80 is connected to the input shaft 42 via a coupler 84. The coupler 84 is suitable for transmitting a rotation from the motor shaft 80 to the input shaft 42 while allowing a radial and/or angular misalignment between the input shaft Z-Z and the motor axis A-A. The minimum allowed radial misalignment is for example 5 mm. The minimum allowed angular misalignment between the input shaft Z-Z and the motor axis A-A is for example 1°.

The reduction gear housing 40 and the mill housing 4 are separate and separable elements and are not manufactured in a single piece or integrally.

As shown in FIG. 1, the mill element 6 is guided relative to the mill housing 4 only via the drive reduction gear 14 and more particularly only by the radial bearing 60 and the outlet wall 52.

The fastening coupler 69 is situated axially between the milling shaft 26 and the radial output bearing 60. Furthermore, the fastening coupler 69 is situated axially between the milling shaft 26 and the axial stop 66.

No other radial or axial bearing supporting the milling element 6 is arranged on the milling element 6.

During the operation of the stirred mill 2, the milling shaft 26 is rotated via the motor 12 and the reduction gear 14. The radial, axial and torque milling forces acting on the milling element 6, in particular during the operation of the mill at nominal power, are transmitted in full by the fastening coupler 69 and are reacted only by the radial bearing 60 and by the axial stop 66 and are transmitted only by the reduction gear housing 40 to the mill housing 4, optionally via the drive support 8.

According to the invention, the reduction gear or the mill is used to react all of the forces acting on the stirred milling element, and in particular all of the milling forces, in particular during milling at a nominal power of the mill, by the axial stop 66, and optionally by the radial bearing 60.

The structure of the mill and the reduction gear described above makes it possible to react very substantial milling forces for given dimensions. The total height of the structure is also small owing to the integration of the axial stop into the reduction gear. This also leads to a simple and compact assembly for a given milling and transmission force.

Alternatively, the reduction gear does not include only one planet reduction stage 70, but rather, the input shaft 42 is connected to an additional planet reduction stage including an input shaft 42 that is connected to the shaft 80. The reduction gear may also comprise three or four planet reduction stages mounted in a cascade.

Alternatively, the reduction gear does not comprise a planet reduction stage, but one or several reduction stages made up of simple parallel gear trains, in particular with cylindrical sprockets.

Alternatively, the reduction gear may be made up of a combination of planet reduction stages and simple parallel gear trains.

The invention claimed is:

1. A reduction transmission for driving a stirred mill, comprising:
   a reduction transmission housing comprising an outlet wall associated with an output shaft, the outlet wall defining an outlet opening that is traversed by the output shaft;
   an input shaft for connection to a drive motor;
   a reduction stage arranged in said reduction transmission housing, comprising a planet reduction gear, comprising:
      a planet carrier;
      a crown;
      a sun gear; and
      planet gears;
   the output shaft, which extends along an output axis, for connection to a stirred mill element and driven by said reduction stage, the output shaft being secured to a support flange, the support flange being secured to said planet carrier, the output shaft comprising:
      a proximal axial side, connected to said reduction stage, formed with the support flange; and
      a distal axial side, opposite said proximal axial side and fastened to the stirred mill element; and
   axial stop comprising either an axial bearing or a thrust bearing with rolling elements, axially guiding said output shaft and limiting an axial movement of said output shaft in a direction oriented from said proximal axial side toward said distal axial side, the support flange bearing on the axial stop, and the axial stop being supported by said outlet wall.

2. The reduction transmission according to claim 1, further comprising a radial output bearing arranged in the outlet opening, and wherein said output shaft is guided relative to said outlet wall by said radial outlet bearing.

3. The reduction transmission according to claim 2, wherein said axial stop is arranged axially between said reduction stage and said outlet wall.

4. The reduction transmission according to claim 2, wherein said radial output bearing is a radial rolling bearing.

5. The reduction transmission according to claim 1, wherein said output shaft comprises a fastening flange suitable for fastening the stirred mill element.

6. The reduction transmission according to claim 1, wherein said axial stop is an axial hydrostatic or axial hydrodynamic bearing.

7. The reduction transmission according to claim 1, wherein said support flange, said planet carrier, and said output shaft are integral or in a single piece.

8. A stirred mill comprising:
   a mill housing;
   a stirred mill element; and
   a drive reduction transmission for said stirred mill element, comprising:
      a reduction transmission housing comprising an outlet wall associated with an output shaft, the outlet wall defining an outlet opening that is traversed by the output shaft;
      an input shaft connected to a drive motor;
      a reduction stage arranged in said reduction transmission housing, comprising a planet reduction gear, comprising:
         a planet carrier;
         a crown;
         a sun gear; and
         planet gears;
      the output shaft, extending along an output axis, and driven by said reduction stage, the output shaft being secured to a support flange, the support flange being secured to said planet carrier, the output shaft comprising:
         a proximal axial side, connected to said reduction stage, formed with the support flange; and
         a distal axial side, opposite said proximal axial side and fastened to said stirred mill element; and
      an axial stop comprising either an axial bearing or a thrust bearing with rolling elements, axially guiding said output shaft and limiting an axial movement of said output shaft in a direction oriented from said proximal axial side toward said distal axial side, the support flange bearing on the axial stop and the axial stop being supported by said outlet wall, wherein said stirred mill element is fastened to said output shaft by a fastening coupler, such that the axial forces generated by a milling process and applied on said stirred mill element are transmitted to said output shaft and are reacted by said axial stop on said outlet wall.

9. The stirred mill according to claim 8, wherein said stirred mill element is guided and maintained relative to said mill housing via said drive reduction transmission.

10. The stirred mill according to claim 8, wherein said stirred mill element is kept cantilevered by said reduction transmission relative to said mill housing, and/or wherein said stirred mill element comprises a free end that is spaced away from said mill housing.

11. The stirred mill according to claim 8, wherein forces acting on said stirred mill element are reacted only by said axial stop.

12. The stirred mill according to claim 11, wherein milling forces are reacted only by said axial stop.

13. A method for using the mill according to claim 8, comprising:
   milling an object with the stirred mill; and
   reacting forces acting on the stirred mill element, during milling by the axial stop.

14. The method for using the mill according to claim 13, wherein said reacting comprises milling at a nominal power of the mill.

15. The stirred mill according to claim 8, further comprising a drive support.

16. The stirred mill according to claim 15, wherein said drive support is arranged on a ceiling wall of said mill housing and serves as a spacer between said mill housing and said drive reduction transmission.

\* \* \* \* \*